United States Patent [19]

Dotson et al.

[11] Patent Number: 4,990,184
[45] Date of Patent: Feb. 5, 1991

[54] WATER REDUCIBLE SOFT COATING COMPOSITIONS

[75] Inventors: Daniel J. Dotson, Huntington, W. Va.; Stephen E. See, Wheelersburg, Ohio

[73] Assignee: Ashland Oil, Inc., Ashland, Ky.

[21] Appl. No.: 337,013

[22] Filed: Apr. 12, 1989

Related U.S. Application Data

[63] Continuation of Ser. No. 124,655, Nov. 24, 1987.

[51] Int. Cl.$^5$ .................... C09D 5/08; C08K 3/38; C08K 3/28; C08L 91/06
[52] U.S. Cl. .................... 106/14.11; 106/14.13; 106/14.15; 106/14.16; 106/14.34; 106/14.35; 106/14.37; 106/14.38; 106/270; 106/271; 106/272; 524/232; 524/275; 524/405; 524/429; 524/376
[58] Field of Search .............. 106/14.11, 14.13, 14.15, 106/14.16, 14.34, 14.35, 14.37, 14.38, 270, 271, 272; 524/232, 275, 405, 429, 376

[56] References Cited

U.S. PATENT DOCUMENTS

| | | | |
|---|---|---|---|
| 3,754,942 | 8/1973 | Moradian | 106/14.38 |
| 4,444,802 | 4/1984 | Winters et al. | 106/14.13 |
| 4,444,803 | 4/1984 | Winters | 427/27 |
| 4,468,254 | 8/1984 | Yokoyama et al. | 106/271 |
| 4,479,981 | 10/1984 | Winters et al. | 106/14.13 |
| 4,594,109 | 6/1986 | Kawabata | 106/271 |
| 4,698,450 | 10/1987 | Nuttens et al. | 585/520 |
| 4,766,166 | 8/1988 | Upadhyaya et al. | 524/275 |
| 4,820,876 | 4/1989 | Nuttens et al. | 568/494 |

OTHER PUBLICATIONS

Patent Abstracts of Japan, vol. 10, No. 214, C362, Abstract of JP 61-55159, publ. 3/19/86, (Nippon Oil Co., Ltd.).

*Primary Examiner*—William R. Dixon, Jr.
*Assistant Examiner*—Helene Klemanski
*Attorney, Agent, or Firm*—Richard C. Willson, Jr.; Stanley M. Welsh

[57] ABSTRACT

Water reducible coating compositions comprising: an oxidized slack wax, paraffin wax or petrolatum; a low molecular weight polyethylene, polybutene, or polypropylene; naphthenic or paraffinic oil; a salt of a sulfonic acid, a nitrate, a nitrite, a borate or an amine soap of a fatty acid; a mixture of mineral spirits and ethylene glycol monopropyl ether; an unsaturated fatty acid (preferably oleic acid) and a fugitive amine (preferably 2-amino-2-methyl-1-propanol); and water are disclosed which provides improved corrosion resistant coatings for ferrous alloys.

11 Claims, 1 Drawing Sheet

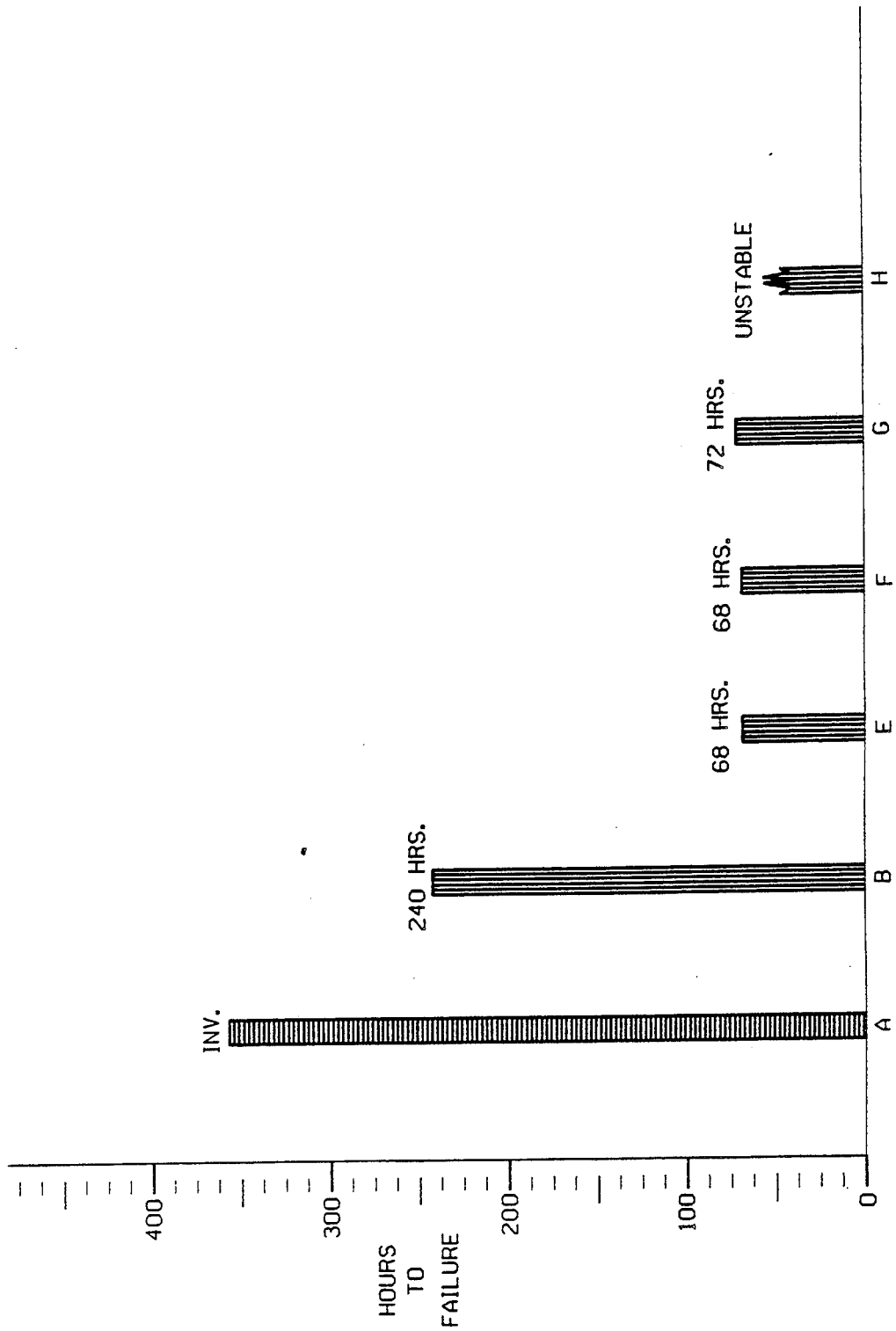

WATER REDUCIBLE SOFT COATING COMPOSITIONS

This application is a continuation of U.S. patent application Ser. No. 124,655, filed Nov. 24, 1987.

BACKGROUND OF THE INVENTION

1. Field of the Invention

The present invention relates particularly to organic coating compositions useful for both permanent and temporary protection of metal part such as cold rolled steel. More particularly, the organic coating compositions of this invention generally are classified 106, particularly in subclasses 14.11, 14.13, 14.15, 14.16, 14.34, 14.35, 14.37, 14.38, 270, 271, and 272.

2. Description of the Prior Art

Yaroshevich U.S. Pat. No. 3,539,367 et al discloses a wax emulsion containing a salt of an organic acid and an amine. Shedahl U.S. Pat. No. 3,660,128 teaches an alkanolamine and an aliphatic carboxylic acid in the preparation of a semi-solid wax-in-water emulsion. Wilson U.S. Pat. No. 2,349,326 teaches a combination of morpholine and a fatty acid to emulsify waxy materials in water for paste-type waxes. Simmonds U.S. Pat. No. 3,125,453 employs a mixture of triethanolamine and an acid to emulsify a mixture of waxes also for paste-type polishes.

Davis U.S. Pat. No. 4035,514 teaches a water-dispersible petrolatum composition containing cetyl alcohol, lanolin alcohols and alkoxylate fatty acids esters of sorbitol.

Most of the above teach production of temporary coatings such as floor waxes, cosmetics and the like. In contrast, the present invention, possibly through the use of co-solvents which tend to form azeotropes which enhance water removal during curing, provides coatings having substantial life even in corrosive environments. While not wishing to be bound to any theory or mechanism, it appears the co-solvents tend to act as dispersing agents and additionally enhance stability of the liquid compositions at low temperatures.

Also, the inclusion of the salts of organic acids in the present invention tend to build longer-chain molecules which additionally deter corrosion and promote stability.

The coatings of the present invention find additional utility as lubricants, e.g. particularly for wire drawing and other metal drawing, extrusion and impact forming operations.

In brief review, other prior U.S. patents of interest include: Yaroschevich U.S. Pat. No. 3,539,367 relates to cationic emulsions (the compositions of the present invention are not cationic emulsions);

Sheldahl U.S. Pat. No. 3,660,128 relates to inverted wax emulsion pastes for artwork;

Wilson U.S. Pat. No. 2,349,326 and Simmonds U.S. Pat. No. 3,125,453 both relate to paste-type polishes;

Westlund et al U.S. Pat. No. 2,862,825, Saywell U.S. Pat. No. 2,943,945 and Kassinger U.S. Pat. No. 3,565,843 all relate to soluble oils not to firm wax coatings;

Miller U.S. Pat. No. 3,434,851 relates to solvent-borne asphalt coatings;

Phillips U.S. Pat. Nos. 3,446,765, Clark U.S. Pat. No. 3,699,065, Scheurman III U.S. Pat No. 4,184,991 Bottom U.S. Pat. No. 3,223,666, Jen U.S. Pat. No. 3,379,548, Hunsucker U.S. Pat. No. 4,039,495, Tobias U.S. Pat. No. 4,051,089 and Hunsucker U.S. Pat. No. 4,081,441, all relate to base resin formulas not to completed coatings; Tobias U.S. Pat. No. 4,051,089 to Tobias and Tobias U.S. Pat. No. 4,051,089 to Tobias and Andrews U.S. Pat. No. 3,494,882, relate to high gloss emulsified polyester emulsions; Tobias U.S. Pat. No. 4,051,089 to Tobias and Howard U.S. Pat. No. 4,187,204, relates to waterborne paint containing not over 10% water;

Vosishth and Wang U.S. Pat. No. 4,225,477, relate to co-solvent changes in water-borne coatings to control re-coatability (the coating's ability to form a substrate for a topcoat);

Williams U.S. Pat. No. 4,148,948 relate to a leveling additive for water dispersible paints; and Howard and Randell U.S. Pat. No. 3,413,227, relate to substituted benzotriazole.

Other patents considered in preparing this application are:
Storck, et al U.S. Pat. No. 3,879,335,
Asseff, P. A., et al U.S. Pat. No. 2,695,910,
Johnson, et al U.S. Pat. No. 3,565,678,
Marshall, et al U.S. Patent No. 4,239,648,
Nishijima, et al U.S. Pat. No. 4,059,452,
Burchart, et al U.S. Pat. No. 3,653,931,
Chan, et al U.S. Pat. No. 3,985,584,
Kotzach, et al U.S. Pat. No. 4,048,374,
Carreny, L. U.S. Pat. No. 3,839,051,
Delcon, et al U.S. Pat. No. 3,903,346,
Yalloorakis, M. D. U.S. Pat. No. 3,864,322,
Hung, T. M. U.S. Pat. No. 4,062,821,
Tomalia, D. A. U.S. Pat. No. 3,773,550,
Davis, R. I. U.S. Pat. No. 4,035,514,
Gillich, T. N. U.S. Pat. No. 4,162,920,
Erby, et al U.S. Pat. No. 3,661,796,
Wollak, et al U.S. Pat. No. 3,313,635,
Fessler, et al U.S. Pat. No. 8,080,221,
Jarvis, W. H. U.S. Pat. No. 3,738,851,
Johnson, K. L. U.S. Pat. No. 3,726,807,
Northan et al. U.S. Pat. No. 3,642,653, Problems with protective coatings for metals, especially those primarily intended for long-term storage protection, have always existed. Prominent difficulties have been tackiness, poor water removability, sensitivity to water, objectionable odor, and, where waterborne compositions are involved, limited high-temperature storage stability of the compositions themselves.

In general, the main benefit of a water reducible coating is that it reduces the amount of organic volatiles that are given off during a coating process. Another advantage is that use of such materials is safer both for people and for the environment.

Any water reducible composition involving an emulsion must have sufficient storage stability in order to have practical commercial applications For example, a drum of a water reducible emulsion must remain homogeneous for a sufficient amount of time after packaging to permit use by an end use customer, who in turn may have to store the drum in this inventory prior to his use.

It is an object of this invention to provide a sufficiently stable emulsion to have a storage life of at least 6 months when subjected to storage temperatures in the range of 50–90° F. (10–32° C.).

It is an object of this invention to provide a composition suitable for use in airless spray-type equipment such as 17:1 ratio pump sold by Graco and Alemite, etc.

It is a further object of this invention to provide an emulsion composition which can be used in "dip coating" operations. A "dip coating operation" for purpose of this specification involves the process of immersing a part to be coated totally within the composition, removing, and allowing any excess to drip off or flow off from the part, thereby forming a protective film coating thereon.

It is still another object of this invention to provide a coating composition which when formed into a film yields a film which can be both permanent or easily removed. By "easily removed" is meant for purposes of this invention removal by water at a temperature of at least 160° F. (71° C.).

It is another object of this invention to provide a composition that yields a film which provides permanent protection in that it has sufficient water resistance that mere contact with water under ordinary circumstances up to a temperature of 120° F. (49° C.) will not dissolve (situations wherein the film becomes undesirable for its purpose of protection).

It is still another object of this invention to provide both salt spray (ASTM B-117 corrosion test) and humidity protection (ASTM D-1748) in excess o what would otherwise be available in the prior art of any soft film forming water-borne emulsion coating composition.

It is still another object of this invention to provide an emulsion composition for coatings having a Brookfield viscosity according to ASTM D-2196 of about 20,000 cps at 2 rpm to about 30,000 cps both at 77° F. (25° C.) temperature.

Other objects of this invention will be clear to those of skill in the art based upon this specification.

BRIEF DESCRIPTION OF THE DRAWING

Legend

A. Invention Oxidized, One Vessel, Sulfonate, Anionic
B. Comp.-Unoxidized, One Vessel, Sulfonate, Anionic
E. Comp.-Unoxidized, Degras
F. Comp.-Unoxidized, Degras
G. Comp.-Unoxidized, No Mineral Spirits
H. Comp.-Non-Ionic The figure is a bar graph comparing the hours to failure under ASTM B117 salt spray test for the number of examples shown in Table 1.

SUMMARY OF THE INVENTION

We have found surprisingly that all of the heretofore disclosed objects can be achieved by a coating composition comprising:
(1) One or more film forming waxes;
(2) Wax modifiers;
(3) Corrosion inhibitors;
(4) A coalescent film forming agent which assists processing of the wax components of this composition;
(5) A dual component anionic surfactant to stabilize oil-in-water emulsions; and
(6) Water.

Broadly, an oil-in-water coating composition of this invention has emulsified wax containing particles capable of imparting a corrosion resistant coating to metal surfaces. The composition comprises the following:

(a) about 10 to 30% by weight, preferably 15 to 25% by weight and still more preferably 18 to 20% by weight of a material selected from the group consisting of slack wax, paraffin wax, and petrolatum that are oxidized, or mixtures thereof;

(b) about 1.5 to 5 percent by weight, preferably 2 to 4 percent by weight, and more preferably 2.3 to 3.5 percent by weight of a film forming polymer selected from the group consisting of polyethylene, polybutene, and polypropylene;

(c) about 1 to 4 percent by weight, preferably 2 to 3 percent by weight of a wax modifier selected from the group consisting of naphthenic oil and paraffinic oil;

(d) about 1 to about 6 percent by weight, preferably 3 to 5 percent by weight and still more preferably 4 to 5 percent by weight of : corrosion inhibitor selected from the group consisting of a sulfonic acid salt, a nitrate, a nitrite, a borate, or an amine soap of a fatty acid;

(e) about 1 to 10 percent by weight, preferably 3 to 8 percent by weight, and more preferably 4 to 6 percent by weight of a processing aid for making the components of this composition combine more easily during compounding comprising mineral spirits and ethylene monopropyl ether;

(f) about 1 to 6 percent by weight, preferably 2 to 5 percent by weight and more preferably 3 to 4 percent by weight of a dual component anionic surfactant to stabilize oil-in-water emulsions selected from the group consisting of an unsaturated fatty acid and a fugitive amine with sufficient amine to yield a pH in the range of about 8 to 10 for the composition; and (g) about 30 to 80 percent by weight, preferably 40 to 70 percent by weight, and still more preferably about 50 to 60 percent by weight of water.

Throughout this specification and claims: "% by weight" or any "percent", unless otherwise expressly defined, mean percent of weight of a component based upon the total weight of the weight are given in a claim for several different components, selection of particular percent by weight for each component when added together with all other components must equal 100%.

"An equivalent diameter of a particle" means the diameter that a sphere would have which would have the same surface to volume ratio as that of the particle "Average molecular weights" or "molecular weight" are number average molecular weights.

"Hydrocarbyl" means a molecule consisting of primarily, e.g. at least 85 percent by weight, hydrogen and carbon atoms with minor amounts, e.g. less than 15 percent by weight, nitrogen, oxygen, or sulfur.

"Oxidized wax" means a wax that has undergone oxidation resulting from bubbling air through a molten wax with or without the use of any catalysts. Examples of air blown oxidation can be found in U.S. 4,544,411 (1985).

DETAILED DESCRIPTION OF THE INVENTION

Waxes

Preferably, the wax employed in this invention is an oxidized air-blown slack wax having an acid number in the range of about 25 to 30. The unoxidized slack wax has a boiling point at one atmosphere in the range of 650–950° F. (343–510° C.); a melting point in the range 125–130° F. (52–54number per molecule of atoms of carbon in the range of $C_{18}$ to $C_{35}$; an acid number in milligrams of KOH per gram of oxidized wax in the range of about 20–40, preferably 25–30; and an oil content in the range 2–30%. The oil content of the slack wax may however vary and be compensated by other components that can be added to the composition. The amount of oil content provides part of the film forming properties of the slack wax. For example, if there is too little oil present, then the film forming properties of the composition decrease, but if there is too much oil present, then either too tacky a film forms or no film forms at all insofar as the cohesive forces of the wax material are greater than the adhesive forces. Also it is to be noted if the acid number is too high, the emulsion stability tends to decrease and also the film forming properties tend to degrade. On the other hand, too low an acid number has an adverse impact on the emulsion stabilitY. Finally, if the number of carbon atoms of the slack wax prior to oxidation is too low, no stable emulsion forms; and conversely, if too high, then the film formed is higher melting and undesirably more difficult to remove.

Other materials that may be used in addition to or in substitution for oxidized slack wax are: oxidized paraffin wax and oxidized petrolatum. The unoxidized paraffin has the number of carbon atoms in the range of 10 to 80 with a melting point in the range of about 100°-180° F. (38-82° C.). The oxidized paraffin wax has an acid number of from about 10-50, and preferably 20 to 30 milligrams of KOH per gram of wax, an atmospheric boiling point in the range of 650° -950° F. (343-510° C.) and a melting point in the range of about 125° -130° (52° -54° C.). The oil content can vary anywhere in the range of 2%-30%. The oxidized petrolatum is a by-product from distillation residues. It has an acid number in the range of 10-50 and preferably 20-30 acid units (milligrams of KOH per gram of sample material) and a melting point in the range of around 135°-150° F. (57°-66° C.). The carbon number of carbon atoms per molecule of petrolatum ranges suitably from 10 to 80 and preferably from 18 to 45.

Film Formers

In addition to an oxidized slack wax we have found that a linear polyethylene polymer with a terminal carboxylic acid group having a low softening point in the range of at least 158° F. (70° C.), but no more than 230° F. (110° C.), and preferably at least 167° F. (75° C.) but less than 212° F. (100° C.) according to ASTM E-28 and a molecular weight of at least 1500 improves adhesion and tends to impart a softness to the film formed from the composition of this invention. A suitable material for substitution for linear polyethylene polymers for this invention are: polybutenes and amorphous polypropylenes. An example of a suitable polybutene is a thermoplastic isotactic isobutene polymer having an average molecular weight in the range of about 400 to 1900. An example of a suitable polypropylene is an amorphous low molecular weight polypropylene, e.g. having a molecular weight in the range of about 400 to 1900.

We have found with respect to the instant invention that the coating compositions of this invention yield films that provide useful lubricity to threaded parts so that theY may be torqued into place without further treatment or modification of the part. This provides still another useful feature of the instant invention.

To achieve the optimum features of this composition a balance in the concentration of the oxidized slack wax and the linear polymer with terminal carboxylic acid must be made. For example, if too little linear polymer is used, then there is no effect on improving the adhesive properties of the film, and on the other hand if too much is added, the material composition in the emulsion becomes too viscous for useful coating operations.

Wax Modifiers

Any oil that can dissolve in either the oxidized slack wax or the above identified linear polymer can be used. However, if too much of the wax modifier is used then the coating will flow off (melt) at room temperature. On the other hand, if too little of the oil is used then the film becomes too i brittle.

A naphthenic waxy distillate having a viscosity in the range 55-1200 SUS at 100° F. (38° C.) is suitable for this invention. A viscosity in the range of 100-150 SUS at 100° F. (38° C.) is preferred. An example of such a naphthenic waxy distillate is 125 W. D. MacMillan oil. "SUS" means Saybolt Universal Seconds.

Other wax modifiers include paraffinic oils. Paraffinic oils having a viscosity at 100° F. (38° C.) of 55-1200 SUS is suitable though generally not as good as naphthenic oils in emulsions of this invention.

Other wax modifiers that can be used are: 100 Pale Oil, and 330N oil.

Corrosion Inhibitors

Generally, any sulfonate having a cation selected from the group consisting of: Group Ia and IIa of the periodic table shown in *The CRC Handbook of Chemistry and Physics* (62nd Edition), but preferably consisting of: sodium, calcium, barium, ammonium, and potassium and having a molecular weight in the range 300-600 can be used. However, it is to be noted that not all corrosion inhibitors will yield useful compositions.

Some corrosion inhibitors may cause certain iron substrates to become stained For example, lanolin fatty acids, pentalan, and pentaerythritol esters of lanolin fatty acids, when used in water-borne emulsions have been found, in some instances, to form corrosion stains on ferrous containing substrates This discloses the presence of some degradation of such substrates.

Other corrosion inhibitors that may be used, if any, are nitrates, nitrites, amine soaps of fatty acids, and borates. Nitrates include salts or esters of nitric acid such as ammonium nitrate, potassium nitrate, sodium nitrate or other Group Ia and Group IIa salts. Borates includes salts or esters of boric acid such as ammonium borate, sodium borate, or other Group I and Group IIa salts. Amine soaps of fatty acids involve fatty acids having between about 10 and 50 carbon atoms per molecule in the for of Group Ia or Group IIa metal salts. Examples of amine soaps of fatty acids are ammonium stearates, sodium stearates, potassium stearates, or alkaline earth metal salts such as calcium in Group IIa.

Broadly, the characteristics necessary for the corrosion inhibitors of this invention are alkali metal or alkaline earth salt of sulfonic acids, and esters of synthetic hydrocarbon fatty acids having between 10 and 50 carbon atoms per molecule.

Film Coalescing Agents

The film coalescing agents of this invention serve a triple function. The first is that it permits the waxes to be more easily processed so as to form emulsions at low temperatures and pressures. This provides, as one skilled in the art would recognize, still another example of an advantage to the emulsion composition of the instant invention; mainly, it can be prepared without pressure vessels at low temperatures. The second function of these coalescent film forming materials is to assist the formation of a uniform film during drying of the coating composition. In other words, to permit and assist the wax components to flow uniformly into one another so as to form a uniform film. A third function of these coalescent film forming materials is as we have discovered, they improve adhesion of the waxy films to oily substrates.

We have found a mixture of mineral spirits and ethylene glycol monopropyl ether are particularly advantageous. Not all glycol ethers in fact work. We have found, for example, that ethylene glycol monobutyl ether does not work.

For purposes of this invention, mineral spirits is characterized as follows: a refined aliphatic hydrocarbon distillate ASTM D-235.

The ratio of mineral spirits to ethylene glycol monopropyl ether is preferable about 1 to 1 by weight. If the ratio is much outside of this range, either there being too much mineral spirits, then separation occurs. On the other hand, if there is too little mineral spirits versus ethylene glycol monopropyl ether present, then poor film forming tends to occur.

In general, if there is an insufficient amount of coalescent film forming materials present in the composition, then pinholing or poor leveling tends to occur (poor film forming).

Surfactants

Preferably an anionic surfactant to stabilize the oil-in-water emulsions is used. We have found a particularly advantageous surfactant to consist of 2 component mixture, which for purposes of this invention may be reacted or unreacted prior to introduction into the composition. One component consists an unsaturated fatty acid such as oleic acid, stearic, isostearic and linoleic. The other component is preferably a fugitive amine such as 2-amino-2-methyl-1-propanol, morpholine, diethanolamine and triethanolamine.

It is to be noted, however, that morpholine has health hazards associated wit it and for that reason is not preferred in the instant invention.

The amine component of the emulsion composition is added to obtain a pH in the range of about 8-10. If the pH is too high the stability of the emulsion diminishes and may in fact be broken. On the other hand, if the pH is too low the material does not provide sufficient surfactant properties that the viscosity then tends to be too high.

Water

The water component preferably does not have interfering cations such as calcium, salts and the like. It has been found that if there are too many salts present in the water the emulsion stability is adversely impacted. We have found that the emulsion does have some inherent stability to the extent that it can tolerate some cations, but preferably for purposes of achieving uniform consistency, deionized or distilled water is to be preferred.

If there is too little water present in the emulsion then the viscosity increases to a point where the product cannot be applied. If there is too much, then poor film formation occurs.

The composition of the present invention comprises: (i) about 10 to 30% by weight of a slack wax which as a preoxidized wax has a number of carbon atoms per molecule in the range $C_{18}$-$C_{35}$ with an acid number after oxidation in milligrams of KOH per gram of wax in the range of from about 10 to 50 and preferably 20 to 30; (ii) about 1.5 to about 5% by weight of a low molecular weight linear polyethylene and with a terminal carboxylic acid having a molecular weight of at least 1500 and further characterized as having a softening point according to ASTM E-28 in the range of at least 158° F. (70° C.) but less than 212° F. (100° C.) and preferably at least 190° F. (88° C.) but less that i 212° F. (100° C.), with an acid number in the range 1-5; (iii) about 1 to 4% by weight of an oil characterized as follows: a waxy distillate having a viscosity in the range of 100-150 SUS at 100° F. (38° C.); (iv) about 1 to 6% by weight of a corrosion inhibitor comprising a sulfonic acid salt having a cation selected from the group consisting of: Group Ia and IIa of the periodic table, but preferably consisting of: sodium; calcium, barium, ammonium and potassium and having a molecular weight in the range 300-600; (v) 1-10% by weight of a mixture comprising mineral spirits and ethylene glycol monopropyl ether preferably in a ratio of mineral spirits to glycol ether in the range of about 0.7:1 to 1:0.7; (vi) about 1 to 6% by weight of a mixture or reaction product of an unsaturated fatty acid selected from the group consisting of oleic acid, stearic, isostearic, linoleic and a fugitive amine selected from the group consisting 2-amino-2-methyl-1-propanol and morpholine, triethonolamine; and (vii) more than about 25% by weight, and preferably in a range of about 30 to 80% by weight of water.

The emulsion composition of the instant invention in order to achieve optimum stability has emulsified particles with a size in the range 0.1-5.0 microns. Preferably, we have found that it is possible to achieve appropriate particle sizes by means of a Gaulin mill. A Gaulin mill is a two-stage homogenizer that provide high energy inputs at an emulsifier head. This reduces the amount of energy required to obtain a stable emulsion. The molten phase of the wax and water blend added to the homogenizer is at a temperature preferably in the range of 150-200° F. (66-93° C.) and pumped through a rotameter at a pressure in the range of 1000-10,000 psi, most preferably 2000-5000 psi. From the homogenizer, the product is pumped through cooling coils to reduce the temperature promptly after homogenization to approximately 100° F. (38° C.). At this point the wax particle size of the emulsion will remain small and stable with a particle size in the range of 0.5-5.0 microns.

EXAMPLE 1

Preparation of Emulsions

There are two methods available for preparing the emulsions of this invention. The first method is as follows.

A single vessel closed with a reflux condenser is charged with an oxidized neutral 330 slack wax (an Ashland Oil, Inc., product sold under the name 330 Neutral Slack Wax); 125 MacMillan Oil; Allied Chemical's ACX 33 which is a polyethylene modifier; N. L. Kimes Company 9025 sodium sulfonate; Eastman Chemical Ektasolve E. P.; Emery's oleic acid 221; Angus Chemical AMP 95; Ashland Oil, Inc's., mineral spirits; and water. For the amounts of each of these components see Table 1 column A.

These materials are heated slowly, e.g., roughly 2-4° F. (0.9-1.9° C.) per minute, until a molten material is achieved at 140° F. (60° C.). At this point the materials being in a molten, semi-viscous fluid state are agitated at a rate of between 4-600 revolutions per minute using an impeller blade. Heating is continued with a temperature increase being maintained at roughly 2-4° F. (9-1.9° C.) per minute up to 190° F. (88° C.). The material is stirred at 190° F. (88° C.) for roughly two hours to insure uniformity and a completely homogenized mixture.

A sample of material is removed and its pH determined to insure that it is within the range of 8.5-9. If the pH is not high enough, then the pH is i adjusted by the addition of AMP 95 (an Angus Chemical amine). If on the other hand the pH is too high, then we must add an acidic specie such as Emery's 221 oleic acid. The pH of the total homogenous mixture is adjusted to be within the pH range of 8.5–9.

The mixture from the enclosed vessel is passed through a Gaulin homogenizer mixer which is at a pressure of 2000–5000 psi (pounds per square inch).

Subsequent to passing through the Gaulin mill, the material is immediately passed through heat exchange coils so as to reduce the temperature from 190° F. (88° C.) to below 120° F. (49° C.). This establishes the particle size and stabilized the homogenized mixture. The final particle size the material in the mixture can be determined by a Hegman gauge. The value determined by the Hegman gauge should be better than a value of 7. In general, the smaller the particle size, the better is the emulsion's stability and utility.

GENERAL DISCUSSION OF THE RANGES OF THE MATERIALS

At least 10% by weight of a film forming material such as an oxidized slack wax is required in order to form a film. On the other hand, if more than about 40% by weight of the material is used, then the material becomes too viscous and hard to properly homogenize. Preferred is about 15–25% by weight.

With respect to the polyethylene polymer, if less than about 0.5% by weight of polymer is used, then the tackiness or ability of the material to adhere to metal surfaces decreases to a point which is undesirable from an applications standpoint. On the other hand, if above about 10% by weight of polyethylene polymer is used, then the material becomes too viscous and harder and harder to remove. Remember that ready removal of this film is an important feature of its usefulness. Preferred is about 1.5–5% by weight. The wax modifier (napthenic and/or paraffinic oil) should preferably constitute about 0.5–10% by weight with 1–8% more preferred.

With respect to sulfonate corrosion inhibitor, if less than about 0.5% by weight is used, then the effectiveness of corrosion inhibition is too small to have practical usefulness. On the other hand, however, if more than 10% is used then the stability of the emulsion can be adversely impacted, such as in the case of nitrites and nitrates. In the case of too much of an anionic amine soap of a fatty acid in the composition, then the material becomes too water sensitive and sticky. This would then adversely impact the water sensitivity of a film resulting from its application to a substrate. Preferred range is 1–10% by weight.

The mixed mineral spirits/ethylene glycol processing aid should preferably be about 1–15% by weight with 2–10% more preferred.

TABLE I

EXAMPLE 2 - COMPOSITIONS WITH TABLE DISCLOSING PROPERTIES OF VARIOUS COATINGS FORMED WITH SUCH COMPOSITIONS

| R.M. | Inv. Vessel A B1021-177A | Unoxid Vessel B B1021-177B | C B1021-172 | D B1021-162 | E -154 | F -146 | G -140 | H -137 | I -83 | J -84 |
|---|---|---|---|---|---|---|---|---|---|---|
| Oxidized 330N Slack Wax | 18 | — | 18 | 18 | — | — | — | — | — | — |
| Penreco 125 Wax | — | 12.5 | — | — | — | 15 | 15 | 22 | — | — |
| Unoxidized 330N Wax | — | — | — | — | — | — | — | — | 25 | 30 |
| 110N Slack Wax | — | — | — | — | 17.0 | — | — | — | — | — |
| 125 MacMillan Oil | 2 | 10.0 | 2 | 2 | 8.0 | 10 | 10 | 7 | — | — |
| ACX 33 | 3 | 2.5 | 3 | 3 | — | — | — | — | — | — |
| Degras | — | — | — | — | 5 | 5 | 5 | 5 | 5 | — |
| Kimes 9025 | 5 | 5 | 5 | 5 | — | — | — | — | — | — |
| Oxidized Petrolatum | — | — | — | — | — | — | — | — | — | — |
| Toluene | — | — | — | — | — | — | — | — | — | — |
| HiSol 10 | — | — | — | — | — | — | — | — | 5.0 | — |
| Ektasolve EP | 4 | 4 | 4 | — | 4 | 3 | 5 | 5.06 | — | — |
| Kerosene | — | — | — | — | — | — | — | — | — | 5 |
| Oleic Acid 221 | 5 | 5 | 5 | 5 | 5 | 5 | 5 | — | 5 | 5 |
| AMP-95 | 2 | 2 | 2 | 2 | — | — | — | 1.99 | 2 | 2 |
| Morpholine | — | — | — | — | 2 | 2 | 2 | — | — | — |
| Mineral Spirits | 4 | 4 | 4 | — | 4 | 4 | — | — | — | — |
| Ethylene Glycol | — | — | — | — | — | 2 | — | — | — | — |
| Span 60 | — | — | — | — | — | — | — | 6 | — | — |
| Tween 60 | — | — | — | — | — | — | — | 5 | — | — |
| Water | 57 | 55 | 57 | 65 | 55 | 54 | 58 | 55.42 | 58 | 58 |

TEST RESULTS FROM EXAMPLES OF TABLE I

| Test Results | Inv. Vessel A | Unoxid Vessel B | C | D | E | F | G | H | I | J |
|---|---|---|---|---|---|---|---|---|---|---|
| PH | 8.7 | 8.5 | 8.71 | 8.6 | 8.6 | 8.6 | 8.7 | 8.7 | 8.8 | 8.8 |
| % N.V. | 36.32 | 35.91 | 31.50 | 35.0 | 34.60 | 37.2 | 35 | 45 | 35 | 25 |
| Viscosity | Brookfield #5 30,000 cps 2 rpm | Brookfield #5 2 rpm = 15,000 | Brookfield #5 2 rpm = 30,000 | #3 Zahn 10 Seconds | #3 Zahn 22 Seconds | #3 Zahn 12 Seconds | #3 Zahn 30 Seconds | Poor Emulsion | Inverted Emulsion | Inverted Emulsion |
| Salt Fog Performance | 360 Hours | 240 Hours | 240 Hours | 50% Rust 72 Hours | 10% Rust 68 Hours | 2% Rust 72 Hours | 2% Rust 72 Hours | Did Not Test | — | — |
| Humidity Perform- | 1,000 Hours | 1,000 hours | 1,000 Hours | 1% Rust 250 Hours | 2% Rust 360 Hours | 2% Rust 144 Hours | 2% Rust 144 Hours | Did Not Test | — | — |

TEST RESULTS FROM EXAMPLES OF TABLE I

| Test Results | Inv. Vessel A | Unoxid Vessel B | C | D | E | F | G | H | I | J |
|---|---|---|---|---|---|---|---|---|---|---|
| ance | | | | | | | | | | |
| Stability of Emulsion | Excellent After 3 Mo. | Excellent After 3 Mo. | Excellent After 3 Mo. | Separation in 3 Mo. | Separation in 1 Mo. | Slight Separation | 1 Month Separation | Did Not Test | — | — |
| Particle Growth | Hegman 7 Plus None | Hegman 7 Plus None | Hegman 7 Plus None | Hegman 6 None | Hegman 3-4 Yes | Hegman 6 None | Hegman 3 Yes | Did Not Test | — | — |
| Film Appearance | Smooth | Smooth | Smooth | Poor Leveling | Grainy | Smooth | Grainy | Did Not Test | — | — |
| Shelf Staining Noticed | None | None | None | None | Yes | Yes | Yes | Did Not Test | — | — |
| Preparation Method | One Vessel | One Vessel | Two Vessel EP in Water Phase | Two Vessel with No Solvent | Two Vessel | Two Vessel EP in Water Phase | Two Vessel | Two Vessel | Two Vessel | Two Vessel |

The following is a discussion of the test results observed in Table I.

An inverted emulsion is one in which the continuous phase is the wax rather than the water. The object of a wax emulsion is to have the wax in particles carried by water so that the water can be added to reduce the viscosity of the emulsion.

In a salt fog performance test (ASTM B117) any rust anywhere near 1% is too much. In point of fact the ideal is much less than 1% certainly no more than ½%. On this basis, only column A of Table I indicates a successful composition.

Humidity performance (ASTM D1748A) similarly cannot have anywhere near 1% or more rust.

Stability of an emulsion is determined at room temperature on the shelf. The emulsion is observed each day to ensure that there is no separation into different phases. Another way to observe how effectively the emulsion is remaining stable is by observing particle growth by a Hegman determination. 7+ is a good particle size. The larger the Hegman number the smaller the particles. As wax particles grow in size, the stability of the emulsion tends to decrease. In this regard, Hegman of 6 or less increases dramatically the likelihood of a separation into different phases.

Film performance varies from smooth, to grainy, to poor leveling. A smooth film is one that is level and clear indicating that there has been uniform and complete coalescence of the film forming waxes. Lack of clarity, discontinuities of light penetration or discontinuities in the uniformity of film phases, all tend to increase the likelihood of loss of protection from penetration at these points of water or moisture. Poor leveling indicates a lack of film forming ability. Graininess suggests discontinuities in film due to a separation of the various phase components in the mixture. Graininess also suggests an insufficient amount of wax modifiers or flow modifiers or flow coalescence solvents.

Preparation of Emulsion (Preferred Method)

Using Closed One Vessel Method with Reflux Condenser

1. Charge all ingredients (oxidized 330N Slack Wax, 125 MacMillan Oil, ACX 33, Kimes 9025, Ektasolve EP, Oleic Acid 221, AMP-95, Mineral Spirit and Water) to a closed vessel.

2. Slowly heat materials to 140° F. (60° C.) to form a molten mass. Begin to agitate, allowing a two to four degrees per minute increase in temperature.

3. Heat slowly to 180°-190° F. (82°-88° C.), about four to six degrees a minute and agitate for at least two hours. Check blend's pH which should be 8.5 to 9.0. Adjust if needed with AMP-95.

4. Add the molten mixture to a Gaulin type mill homogenizer at 180°-190° F. (82°-88° C.). It should be pumped through the mill at a pressure of 2000 to 5000 psi. From the homogenizer, the product is rapidly pumped through cooling coils to drop the temperature from 190° F. (88° C.) to below 120° F. (49° C.) very quickly.

Alternate Method (Two Vessel)

Another method to prepare the oil-in-water emulsion:

1. Charge oxidized 330N Slack Wax (molten), 125 MacMillan Oil, ACX-33, Oleic Acid 221, Kimes 9025 to a kettle. Heat ingredients to 180°-190° F. (82°-88° C.) with agitation.

2. Charge water to a separate kettle and heat to 190° F. (88° C.).

3. Add mineral spirits and Ektasolve EP to the oil phase when blend is at 150° F. (66° C.).

4. Add amine (AMP-95) to oil phase at 180°-190° F. (82°-88° C.). Mix for five minutes.

5. Charge the oil phase to the hot water kettle slowly with good agitation. Allow blend to remain at 180°-190° F. (82°-88° C.) for 15 to 20 minutes under agitation; then remove heat. Check pH-8.5 to 9.0. Adjust if necessary with an amine (AMP-95).

6. Next step preferred: Add the hot blend to a Gaulin type mill homogenizer. It should be pumped through the mill at 2000 to 5000 psi. From the homogenizer, the product is pumped through cooling coils to drop the temperature from 190° F. (88° C.) to 120° F. (49° C.) very quickly.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein.

Reference to patents made in the Specification is intended to result in such patents being expressly incorporated herein by reference including any patents or other literature references cited within such patents.

As can be seen from the figure, the most preferred embodiment of the invention, the convenient one-vessel preparation, provides 360 hours of salt spray resistance without apparent corrosion. This formulation employs sulfonate corrosion inhibitor and anionic emulsifier.

Example B employed unoxidized paraffin wax in place of the oxidized paraffin wax of the invention and also was made in one vessel employed sulfonate and anionic emulsifier. This comparative Example B lasted only 240 hours under salt spray. Examples E, F and G all substituted DeGras lanolin fatty acid in place of the alkali metal or alkaline earth metal sulfonate preferred for the invention and used unoxidized paraffin wax in place of the oxidized wax of the invention. Each of Examples E. F and G failed within 72 hours or less. Example H was similar to E. F. and G but used a non-ionic rather than the preferred anionic emulsifier of the invention. Example H formed an unstable emulsion and could not be tested.

The special advantage of the present invention, in preferred embodiments, of permitting one-vessel mixing to form stable emulsions without extra vessels which would require additional capital investment and cleaning is economically important. Additionally, the vessels used can be non-pressure types saving further in equipment costs.

It has been discovered that a mixture of mineral spirits with the Ektasolve ethylene glycol monopropyl ether and derivatives (e.g. Kodak's Ektasolve EP) is effective with the invention whereas the mineral spirits alone do not form a stable emulsion and the Ektasolve EP alone also does not form a stable emulsion with the other ingredients of the invention.

An additional advantage of the use of the sulfonate corrosion inhibitors of the invention is the elimination of staining of base metals which occurs when the lanolin derivative DeGras is used as the corrosion inhibitor, the base metal is often stained and this, of course, defeats the purpose of the preventive coating.

The invention which is claimed is:

1. An oil-in-water coating composition having emulsified wax-containing particles capable of imparting a corrosion resistant coating to metal surfaces that is easily removed with hot water, said composition comprising:
   (a) about 10 to 40% by weight of a film forming material selected from the group consisting of slack wax, paraffin wax, or petrolatum, that are oxidized or unoxidized, or a mixture thereof;
   (b) about 0.5 to 10% by weight of a film forming polymer selected from the group consisting of: a substantially linear polyethylene molecule with a terminal carboxylic acid group having a softening point determined according to ASTM E-28 in the range of about 158° F. (70° C.) to 230°F. (110° C.) and a molecular weight of at least 1500; polybutene characterized as an isobutene polymer having an average molecular weight in the range of about 400–1900; and a polypropylene characterized as a hydrocarbyl having a molecular weight in the range of about 400–1900;
   (c) about 0.5 to 10% by weight of a wax modifier selected from the group consisting of naphthenic oil and paraffinic oil;
   (d) about 0.5 to about 10% by weight of a corrosion inhibitor selected from the group consisting of a sulfonic acid salt or an amine soap of a fatty acid;
   (e) about 1 to 15% by weight of a processing aid comprising mineral spirits and ethylene glycol monopropyl ether;
   (f) About 0.5 to 15% by weight of a dual component anionic surfactant; and
   (g) about 30% to 80% by weight of water.

2. The composition of claim 1, wherein said slack wax has a boiling point at one atmosphere in the range of about 650°–950° F. (343°–510° C.), a melting point in the range of about 125°–130° F. (52°–54° C.), a number of carbon atoms per molecule in the range of about 18 to 35, and an acid number in milligrams of KOH per gram of said slack wax after oxidation in the range of about 20–40.

3. The coating composition of claim 1, wherein said paraffin wax before oxidation has a number of carbon atoms per molecule in the range of about 10–80 with a melting point in the range of about 10–50 milligrams of KOH per gram of said oxidized paraffin wax, and an atmospheric boiling point and melting point of said paraffin wax prior to oxidation, respectively, in the range of about 650°–950° F. (443°–510° C.), and in the range of about 125°–130° F. (52°–54° C.).

4. The coating composition of claim 1, wherein said petrolatum prior to oxidation has about 10 to 80 atoms of carbon per molecule, a melting point in the range of about 135°–150° F. (57°–66° C.), and an acid number after oxidation in the range of about 10–50 milligrams of KOH per gram of said petrolatum.

5. The coating composition of claim 1, wherein the naphthenic oil is a distillate having a viscosity in the range of 55–1200 SUS at 100°F. (38°C.).

6. The coating composition of claim 1, wherein the paraffinic oil is a distillate having viscosity of 100°F. (38° C.) of 55–1200 SUS.

7. The coating composition of claim 1, wherein said sulfonic acid salt has a cation selected from the group consisting of: Group Ia and IIa of the periodic table; and a molecular weight in the range of about 300–600.

8. The coating composition of claim 1, wherein mineral spirits and ethylene glycol monopropyl ether are present in a ratio by weight of one to the other of about 1 to 1.

9. The coating composition of claim 1, wherein said surfactant comprises an unsaturated fatty acid reacted with a fugitive amine wherein said unsaturated fatty acid is selected from the group consisting of: oleic acid, stearic acid isostearic acid and linoleic acid and wherein the fugitive amine is selected from the group consisting of: 2-amino-2-methyl-1-propanol, morpholine, diethanolamine, and triethanolamine.

10. The coating composition of claim 1, wherein said fatty acid is selected from the group consisting of: stearic acid, oleic acid, isostearic acid, and linoleic acid.

11. The composition of claim 1, wherein the surfactant is a dual component anionic surfactant to stabilize oil-in-water emulsions selected from the group consisting of an unsaturated fatty acid and a fugitive amine with sufficient amine to yield a pH in the range of about 8–10 for the composition.

* * * * *